United States Patent

Schauffele et al.

[15] 3,707,600

[45] Dec. 26, 1972

[54] DISC CONTROLLED INTERLACED SCANNING RASTER

[72] Inventors: Carl N. Schauffele; Lenard M. Metzger, both of Rochester, N.Y.

[73] Assignee: Eastman Kodak Company, Rochester, N.Y.

[22] Filed: Jan. 18, 1971

[21] Appl. No.: 107,200

[52] U.S. Cl.................178/7.2, 178/6.7, 178/DIG. 28

[51] Int. Cl...............................................H04n 5/38

[58] Field of Search.......178/7.2, 69.5 TV, 6.7, 6.6 A

[56] References Cited

UNITED STATES PATENTS 3,317,663 5/1967 van Dam ..............................178/6.7

*Primary Examiner*—Richard Murray
*Attorney*—W. H. J. Kline and Joseph F. Breimayer

[57] ABSTRACT

Apparatus for scanning the frames of a continuously moving information bearing medium in a television field pattern including a plurality of spaced horizontal lines controlled by a horizontal sweep signal having a predetermined horizontal sweep frequency. A predetermined sweep frequency of the horizontal sweep signal is produced by a horizontal oscillator whose frequency is varied by a control signal produced by a phase detector. A feedback circuit interconnects the output of the horizontal oscillator and one input terminal of a phase detector. The other input terminal of the phase detector is adapted to receive a sync signal having a frequency equal to an integral submultiple of the predetermined horizontal sweep frequency. The phase detector responds to the horizontal sweep signal and the detected sync signal to produce the control signal, the magnitude of which is dependent upon the phase difference therebetween.

5 Claims, 3 Drawing Figures

CARL N. SCHAUFFELE
LENARD M. METZGER
INVENTORS

BY Joseph F. Bruimayer
W. H. J. Kline
ATTORNEYS

CARL N. SCHAUFFELE
LENARD M. METZGER
INVENTORS

BY Joseph T. Breimayer
W. H. J. Kline
ATTORNEYS

CARL N. SCHAUFFELE
LENARD M. METZGER
INVENTORS
BY Joseph F. Breimayer
W. H. J. Kline
ATTORNEYS

DISC CONTROLLED INTERLACED SCANNING RASTER

BACKGROUND OF THE INVENTION

1. Field of the Invention

This invention relates to scanning the frames of continuously moving information bearing media in a television field pattern consisting of a plurality of spaced horizontal line scans, and more particularly, to generating a horizontal sweep signal in response to the rate of movement of the continuously moving information bearing media.

2. Description of the Prior Art

In telecine transmission systems, flying spot scanners have often been used to scan the frames of motion picture film in a scanning raster pattern to produce interlaced television fields representative of the scanned image frames. The scanning raster pattern light beam is modulated by the image pattern of the film frame, and the modulated light is detected and transformed into a video signal by a photosensor. The transmitted video signal representative of the image frames of the motion picture film controls the electron beam of the television receiver tuned to the transmitting station to reproduce the motion picture film frame on the television screen.

Currently standardized television broadcast systems in the United States all employ 2:1 interlace; that is, each frame of video information is displayed in two successive fields. The first field in each frame consists of 262½ odd horizontal scanning lines, and the second field in each frame consists of the remaining 262½ even horizontal scanning lines. The fields are repeated at a rate of 60 per second for black and white transmission and 59.94 per second for color transmission. To generate and maintain 2:1 interlace the field rate (vertical sweep frequency) must be phase locked to the odd integral submultiple of twice the horizontal line sweep frequency. In practice, phase-locked vertical and horizontal synchronization signals are usually generated by frequency division from the same oscillator.

In telecine transmission systems wherein flying spot scanners have been employed to scan the frames of a continuously moving motion picture film with a beam of light in the standard interlaced scanning raster pattern described above, it has been found necessary to deflect the scanning beam a variable amount in the direction of movement of the film at the beginning of each frame in synchronism with the rate of movement of the film. In copending Application Ser. No. 60,502 now U.S. Pat. No. 3,651,254, filed Aug. 3, 1970, assigned to the assignee of this invention, and entitled "-Scanning Apparatus Responsive to the Movement of Image Bearing Media," it is proposed to detect the television field rate from indicia disposed on a disc adapted to rotate with the sprocket wheel of the motion picture film drive. Since the television field rate and raster deflection rate are derived from the actual rate of movement of the motion picture film, there may be difficulty in using an oscillator to generate the horizontal synchronization signals that are employed to trigger the horizontal sweep circuitry of the flying spot scanner.

Since the standard horizontal sweep frequency employed in television of 15,750 Hz, it may be difficult to provide the number of indicia on a track of the disc rotating with the sprocket wheel of the motion picture film drive that are necessary to generate horizontal sync signals at the horizontal sweep frequency. Such a method of sync signal generation would require a relatively large and/or high speed disc in order to produce horizontal sync signals of sufficient accuracy.

SUMMARY OF THE INVENTION

Accordingly, it is an object of the present invention to produce accurate horizontal sweep signals for the flying spot scanner from the rate of movement of the motion picture film.

Another object of the invention is to produce a horizontal sweep signal and a vertical sweep signal in a phase relationship necessary to produce an interlaced scanning raster pattern.

It is also an object of the present invention to generate horizontal and vertical sweep signals for a flying spot scanner adapted to scan image frames of a continuously moving motion picture film in synchronism with the actual rate of movement of the motion picture film.

In accordance with these and other objects of the present invention apparatus is disclosed for scanning a continuously moving information bearing media with repeating line scansions produced at a predetermined sweep frequency. Means responsive to the movement of the information bearing media generate a first signal having a frequency equal to an integral submultiple of the predetermined sweep frequency. Further means produce the sweep signal including frequency control means responsive to the first signal and the sweep signal to control the predetermined sweep frequency.

More particularly, in one illustrative embodiment of the invention, sensing means responsive to the actual rate of movement of the film, detect and generate a sync signal having a frequency equal to an integral submultiple of the predetermined horizontal sweep frequency of the horizontal sweep signal from indicia disposed on a disc mounted for rotation with the sprocket wheel of a motion picture film drive. The sync signal is applied to one input terminal of a phase detector and the horizontal sweep signal is applied to another input terminal of the phase detector. The output signal of the phase detector is integrated over an appropriate sample period to produce a DC control voltage signal. The control voltage signal is applied to a voltage controlled horizontal oscillator which oscillates at the desired horizontal sweep frequency and produces the horizontal sweep signal. In this manner, the voltage controlled horizontal oscillator operates with automatic frequency control to insure accuracy of the frequency of the horizontal sweep signals.

A frequency divider in the automatic frequency control circuit between the output of the voltage controlled horizontal oscillator and the input to the phase detector may be necessary of the frequency of the horizontal sweep signal is a multiple greater than about 10 of the frequency of the sync signal.

Other objects and advantages of the invention will become apparent from the following description taken in conjunction with the accompanying drawings.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENT

Figure 1:
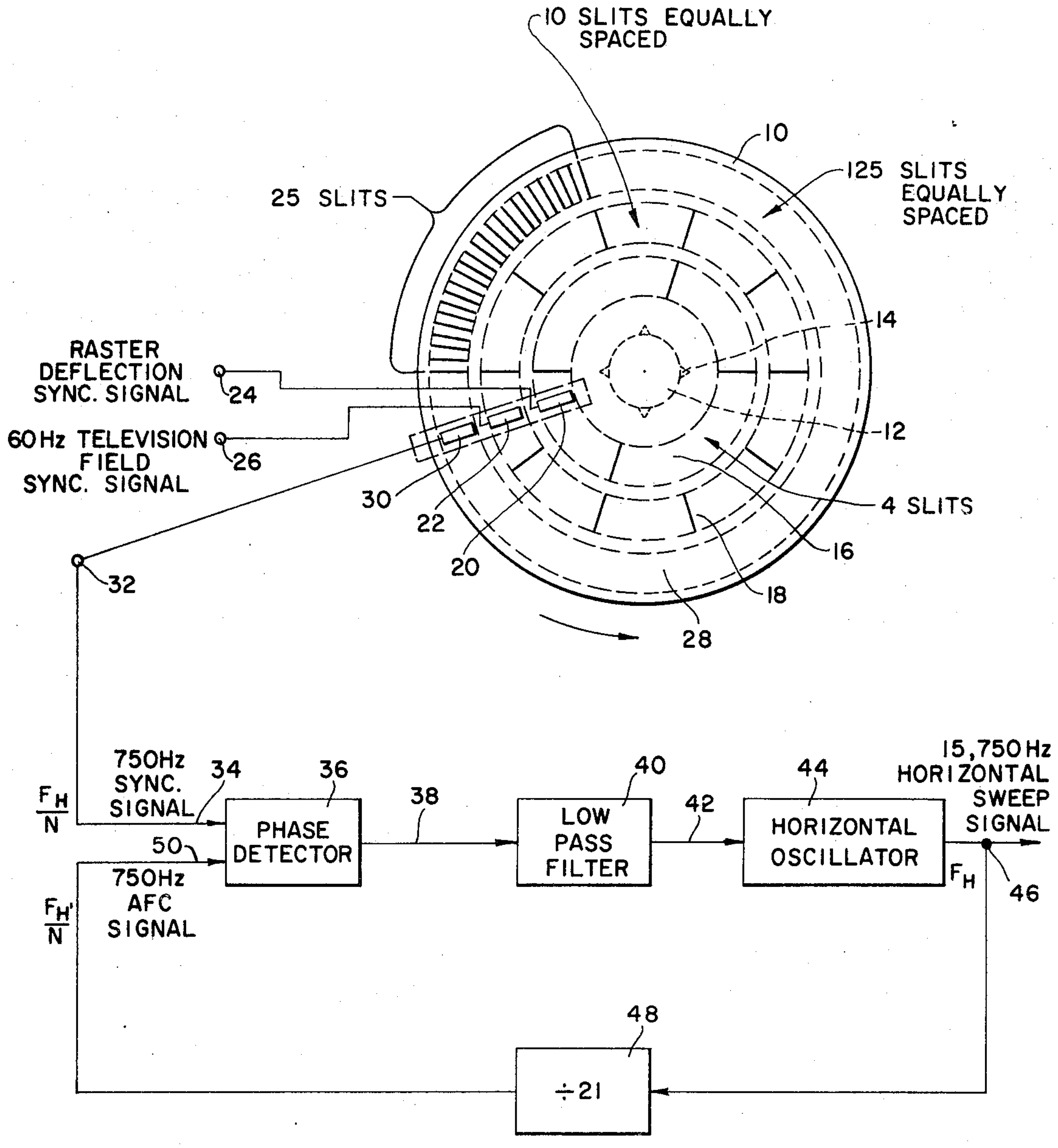
FIG. 1 is a schematic illustration of one embodiment of a circuit for generating a horizontal sweep signal from the detected rate of movement of a motion picture film drive.

Referring now to the drawings and first to FIG. 1 as one preferred embodiment of the invention there is shown a circuit responsive to indicia on a disc adapted to rotate with the drive means of a moving motion picture film in the manner shown, for example in the aforementioned copending Application Ser. No. 60,502, for producing a horizontal sweep signal that is related in phase to a vertical sweep signal so that successive television fields produced by the horizontal and vertical sweep signals are interlaced. In the aforementioned copending Application Ser. No. 60,502 there is shown a flying spot scanning system for converting images on a motion picture film into video signals suitable for television transmission or direct application to a television receiver. The motion picture film is scanned at the 60 field per second video scanning rate that is identical to the black and white television field rate and within allowable tolerances of the standard color television field rate that are commonly employed in the United States. The film is moved continuously at the frame rate at which it was exposed and would normally be projected. In order to scan each film frame by an integral number of television fields in an interlaced pattern of horizontal line scans, there is shown therein a timing disc and vertical deflection circuit that is operative to synchronize the vertical deflection of a scanning beam of the flying spot scanner with the film frame rate.

Referring now to FIG. 1 of the present invention, there is shown a timing disc 10 similar to that employed in the aforementioned copending U.S. Application Ser. No. 60,502. The timing disc 10 is mounted on the sprocket wheel 12 of the motion picture film drive (not shown) and is adapted to rotate at its center at the rate of movement of the motion picture film image frames through the scanning station of the flying spot scanner (not shown). The sprocket wheel 12 has four equally displaced projections 14 which engage the sprocket holes of the motion picture film. Since motion picture film with sound is projected at a rate of 24 frames per second and there are four projections 14, the disc 10 is adapted to rotate at the rate of 24/4 = 6 revolutions per second. The disc 10 has thereon, in two concentric tracks 16 and 18, indicia spaced apart in the identical manner as disclosed in the aforementioned copending U.S. application Ser. No. 60,502, that are effective in cooperation with photosensors 20 and 22, respectively, sensitive to a light source (not shown) modulated by the indicia to produce raster deflection rate signals and television field rate signals at the terminals 24 and 26, respectively. At a rate of rotation of six revolutions per second, the television field rate signal has a frequency equal to 60 Hz, and the raster deflection rate signal has an irregular period related to the rate of movement of the motion picture film. The employment of the raster deflection rate signal and the television field rate signal to produce a vertical deflection signal for the flying spot scanner that has a complex wave form sufficient to track the continuously moving image frames of the motion picture film is shown in detail in the aforementioned copending U.S. Application Ser. No. 60,502 and forms no part of the present invention, and further reference thereto is considered unnecessary to the understanding of the present invention.

The frequency of the horizontal sweep signal $F_h$ applied to the horizontal deflection circuits of the flying spot scanner is selected to be 15,750 Hz which is identical to the standard horizontal sweep signal employed in the U.S. for transmission of black and white video signals. The 15,750 Hz horizontal sweep signal reduces to 262½ cycles of the horizontal sweep signal for each occurrence of the 60 Hz vertical sweep signal. A conceptually straightforward procedure for providing the 15,750 Hz horizontal sweep signal $F_h$ in synchronism with a disc produced 60 Hz vertical sweep signal would be to provide in the track 28 of disc 10, 15,750/6 or 2,625 indicia. However, the production of such a large number of indicia on a relative small disc may be difficult and expensive, and the finely spaced indicia may be difficult to detect by the photosensors.

In accordance with the teachings of the present invention, a third track 28 of indicia is added to the disc 10. Track 28 includes 125 equally spaced indicia, 12½ indicia being disposed between each successive indicia in track 18. These indicia are detected by photosensor 30 which is effective, in cooperation with the light source and with the rotation of the disc 10 at 6 revolutions per second, to produce a 750 Hz sync signal $F_h/N$ (where N is an integer, in this case equal to $F_h/750$, or 21) at output terminal 32.

The requirement of the large number of finely spaced indicia is relieved by the provision, in accordance with applicant's invention shown in FIG. 1, of a voltage controlled horizontal oscillator with automatic frequency control similar to the automatic frequency control circuits of modern television receiver horizontal oscillators. As shown in FIG. 1, the 750 Hz sync signal $F_h/N$ is applied at one input terminal 34 of a phase detector circuit 36. The phase detector circuit 36 is connected at its output terminal by conductor 38 to the input terminal of a low pass filter 40. The phase detector 36 is operative as described hereinafter to produce a variable DC voltage having an amplitude dependent upon the phase relationship of the signals applied at its input terminals, and the low pass filter 40 is operative to integrate the variable DC voltage over a suitable time period to provide at its output terminal a fairly stable DC voltage control signal. The DC voltage control signal is applied by conductor 42 to the input terminal of a voltage controlled horizontal oscillator 44. The frequency of oscillation of the voltage controlled horizontal oscillator 44 is dependent upon the DC voltage level of the voltage control signal applied at its input terminal. As stated hereinbefore, the desired frequency of oscillation of the horizontal oscillator 44 is 15,750 Hz, the standard horizontal sweep signal frequency.

Advantage is taken of the "fly wheel" effect of automatic frequency control to regulate the frequency of the horizontal sweep signal $F_h$ produced at the output terminal 46 of the voltage controlled horizontal oscillator 44. The automatic frequency control consists of the frequency division circuit 48, the phase detector 36 and the low pass filter 40. The horizontal sweep signal $F_h$ is applied to the input terminal of the frequency division circuit 48 which is operative to divide the frequency of the horizontal sweep signal by N, which in this instance equals 21, to produce a 750 Hz AFC signal $F_h'/N$ which is applied to a second input terminal 50 of the phase detector 36. The phase detector circuit 36 is operative to produce the variable DC voltage level signal at its output terminal in accordance with the degree of phase coincidence of the oscillation 750 Hz sync signal $F_h/N$ and a 750 Hz AFC signal $F_h'/N$. Thus, for example, if the signals $F_h/N$ and $F_h'/N$ are in phase or in exact coincidence, the DC voltage level of the output signal of the phase detector 36 is selected to be equal to the voltage level sufficient, when applied by low pass filter 40 to the input terminal of a horizontal oscillator 44, to establish a frequency of oscillation of 15,750 Hz. If, however, the 750 Hz AFC signal $F_h'/N$ lags or leads the 750 Hz sync signal $F_h/N$ the DC voltage level of the output signal of the phase detector 36 will change from the level sufficient to control the oscillation of the voltage controlled horizontal oscillator 44 at 15,750 Hz. Thus, if the signal $F_h'/N$ lags the signal $F_h/N$. the DC voltage of the output signal of the phase detector 36 changes in the direction sufficient to increase the frequency of oscillation of the horizontal oscillator 44. Conversely, if the signal $F_h'/N$ leads the signal $F_h/N$ in phase, the DC voltage level of the output signal of the phase detector 36 changes in a direction sufficient to decrease the frequency of the voltage controlled horizontal oscillator 44. The low pass filter 40 interposed between the phase detector 36 and the voltage controlled horizontal oscillator 44 is operative to integrate the DC voltage levels of the output signals of the phase detector 36 over several cycles of the 750 Hz signals $F_h/N$ and $F_h'/N$ to reduce transient in the input circuit of the voltage controlled horizontal oscillator 44 and to prevent continual changes in the frequency of oscillation of the voltage controlled horizontal oscillator 44 in response to minute differences in the DC levels of the output signal of the phase detector 36.

The phase detector 36, low pass filter 40, and voltage controlled horizontal oscillator 44 all operate in the well-known manner, as described, for example, in the book entitled *Television Engineering Handbook*, by Fink, published by McGraw-Hill Inc.

If the frequency of the sync signal $F_h/N$ detected from the disc 10 is greater than about one-tenth the frequency of the horizontal sweep signal $F_h$, i.e., if N is less than 10, the circuit may be designed to phase lock the horizontal oscillator 44 to the sync signal $F_h/N$ with no frequency division interposed between the output terminal of the horizontal oscillator 44 and the input terminal 50 of the phase detector 36. This system is shown schematically in the circuit diagram of FIG. 2.

Figure 2:
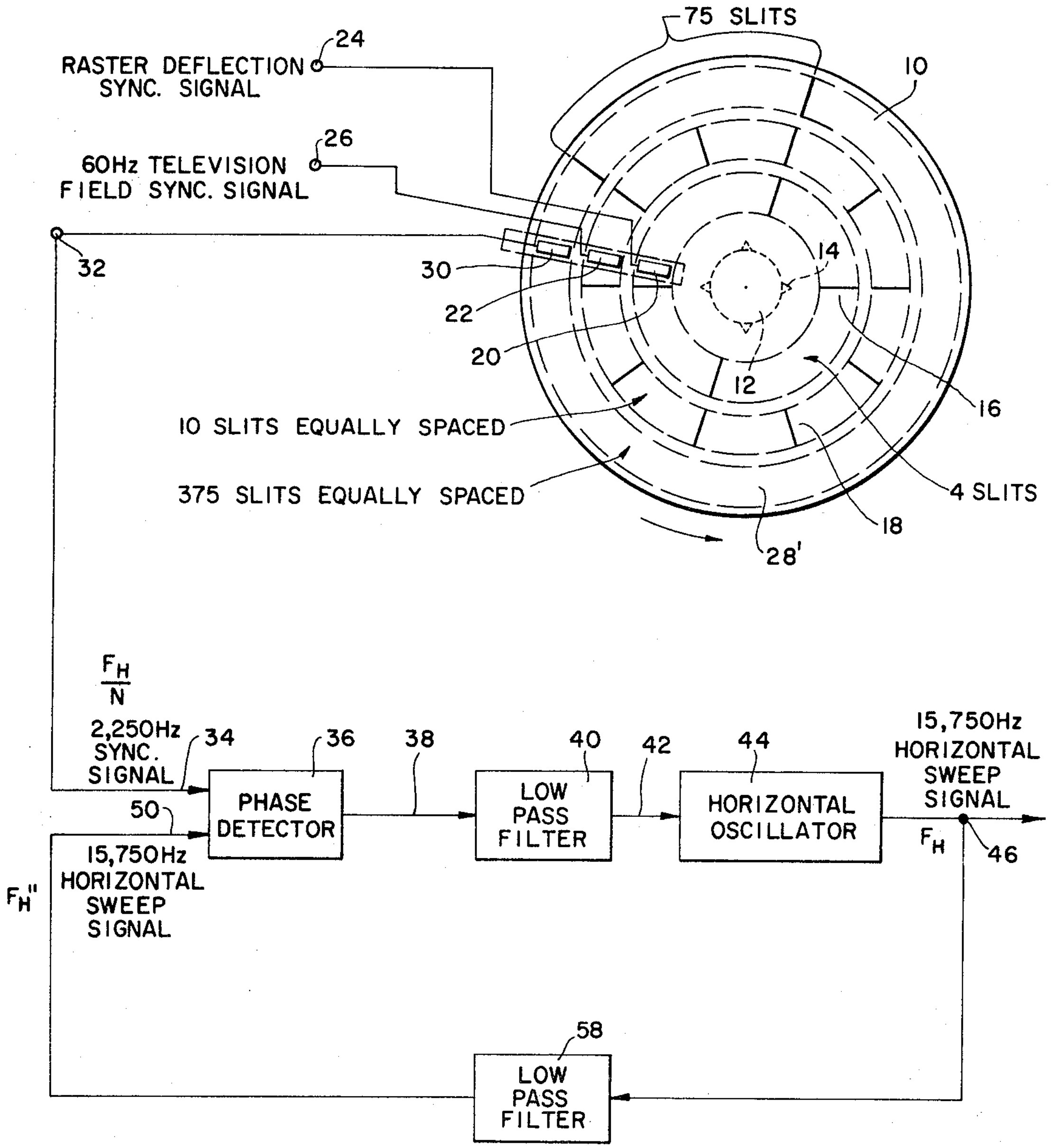
FIG. 2 is a schematic illustration of a further embodiment of a circuit for generating a horizontal sweep signal from the detected rate of movement of a motion picture film drive.

The disc 10 of FIG. 2 rotates at 6 revolutions per second and is identical to the disc 10 of FIG. 1, except for the provision of 37.5 indicia in the track 28' between each indicia of track 18, for a total number of 375 indicia in track 28'. The photosensor 30 detects the indicia and produces a 2,250 Hz sync signal $F_h/N$ at output terminal 32. It will be noted that the frequency of the sync signal $F_h/N$ one-seventh the frequency of the horizontal sweep signal $F_h$, i.e., $N=7$.

Figure 3:
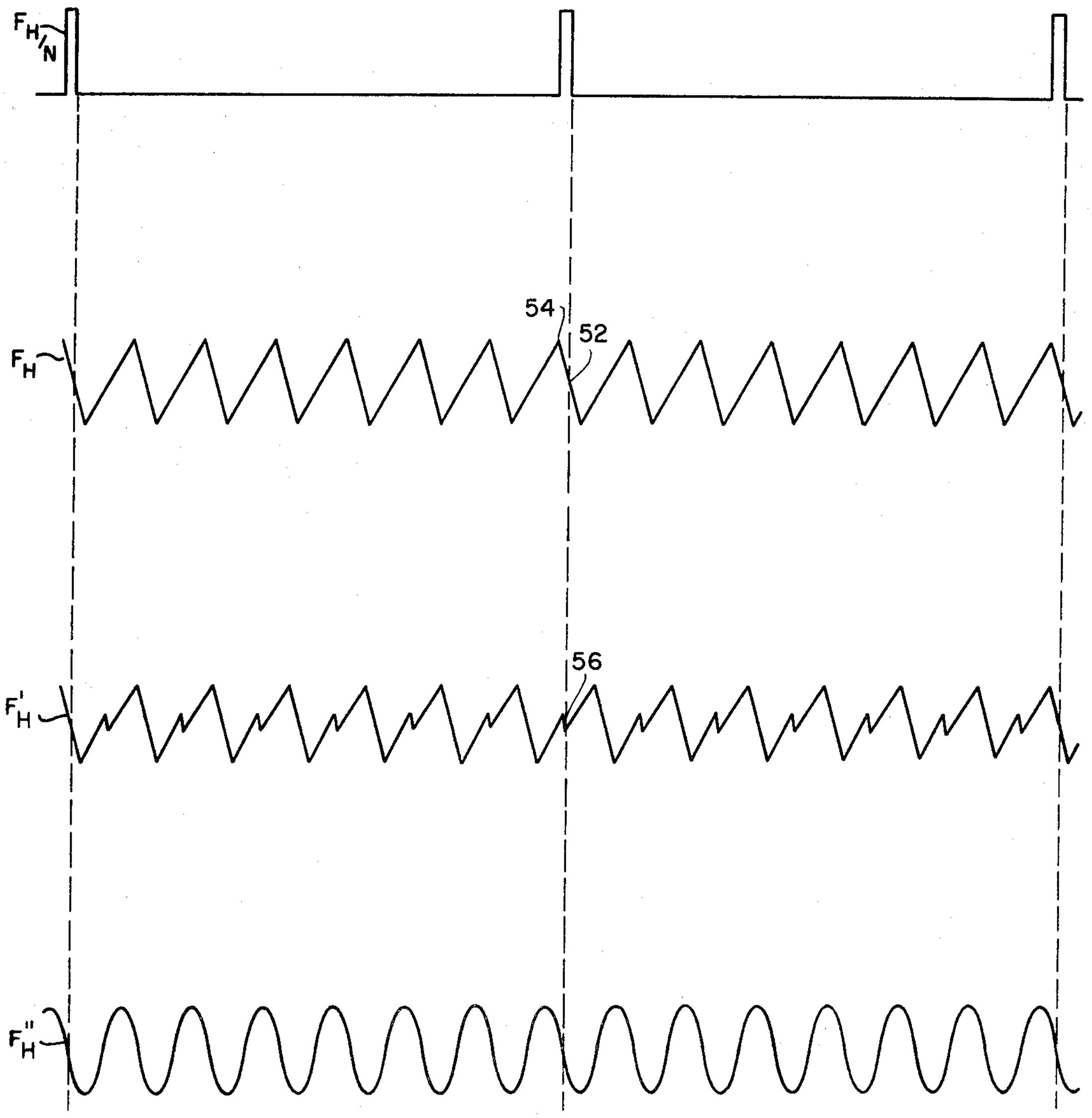
FIG. 3 is a view showing the wave forms of various signals developed at particular points in the circuit diagram of FIG. 2.

The wave form diagram of FIG. 3 depicts the successive occurrences of each pulse of the sync signal $F_h/N$ applied at the input terminal 34 of the phase detector 36 and depicts the horizontal sweep signal $F_h$ in the desired phase relationship with respect to the sync signal to maintain the desired frequency of 15,750 Hz. It will be noted that the sync signal $F_h/N$ is depicted as a square wave form having abrupt rise and fall times and that the horizontal sweep signal $F_h$ is depicted as a sawtooth wave form having a relatively long rise time and an abrupt fall time. The wave forms are depicted in the aforementioned desired phase relationship, but it should be understood that the relative magnitudes and durations of the wave forms may not be in scale.

The phase detector 36 may be designed to produce a DC voltage signal at its output terminal having an amplitude equal to the amplitude of the horizontal sweep signal $F_h$ at the instantaneous occurrence of the sync signal $F_h/N$. As illustrated by the dotted lines between the wave forms of FIG. 3, the sync signal $F_h/N$ samples the amplitude of the horizontal sweep signal $F_h$ at point 52 during the fall time of each respective signal. When the output signal of the phase detector 36 remains at a predetermined voltage amplitude, e.g., point 52 on the wave form of the horizontal sweep signal $F_h$, the voltage controlled horizontal oscillator oscillates at the desired frequency of 15,750 Hz and produces the horizontal sweep signal $F_h$ in the phase relationship depicted.

The phase detector 36 responds to a change in the phase relationship between the horizontal sweep signal $F_h$ and the sync signal $F_h/N$ to increase or decrease the frequency of oscillation of the voltage controlled horizontal oscillator 44 to return the respective signals to the proper phase relationship. For example, if the horizontal sweep signal $F_h$ lags the sync signal $F_h/N$ by less than one half cycle, the wave form of the horizontal sweep signal $F_h$ is sampled at a point, e.g., point 54, that is greater in amplitude than the point 52, and the amplitude of the output signal tends to increase. As the voltage level applied to the input terminal 42 of the voltage controlled horizontal oscillator 44 increases over a number of cycles, the oscillator is designed to respond by increasing its frequency of oscillation. Conversely, if the horizontal sweep signal $F_h$ leads the sync signal $F_h/N$ by less than one half cycle, the voltage amplitude of the output signal applied to the input terminal 42 tends to decrease, and the voltage controlled horizontal oscillator 44 responds thereto to decrease its frequency of oscillation.

A problem that may arise from the operation of the circuit of FIG. 2 as described so far resides in the fact that the phase detector 36 may produce an output signal of the predetermined amplitude of point 52 when the horizontal sweep signal $F_h$ lags or leads the sync signal $F_h/N$ by one or more integral cycles. Stated another way, the phase detector may lock into the sixth or eighth multiple of the sync signal $F_h/N$, i.e., N may become 6 or 8, respectively, instead of 7. To prevent such erroneous lock-in of the phase detector 36, the operating range of the voltage controlled horizontal oscillator 44 may be limited to $(N - ½)/N \times 15,750$ Hz and $(N + ½)/N \times 15,750$ Hz where N is, in this illustrated example, equal to 7. This may be accomplished by limiting the control voltage applied to the input terminal 42 to a predetermined range or by designing the oscillator to respond to a limited range of the control voltage.

Even with the range of the horizontal oscillator 44 so limited, harmonics present in the horizontal sweep signal can still cause improper phase lock of the phase detector 36. Integral harmonics of the sync signal $F_h/N$ and integral or non-integral harmonics of the frequencies within the range $(N - ½)/N \times F_h$ to $(N + ½)/N \times F_h$ may cause erroneous lock-in. In FIG. 3, wave form $F_h$ is illustrative of the example wherein the circuit stabilizes at $N = 6½$, and the frequency of oscillation of the horizontal sweep signal $F_h$ stabilizes at $6½ \times 2,250$ or 14,625. This stabilization occurs because the second harmonic of the 14,625 Hz signal depicted as 56 in the wave form $F_h'$ has a peak voltage that is nearly equal to the predetermined voltage amplitude of point 52. The wave form $F_h'$ sampled by the sync signal $F_h/N$ results in an output signal of the phase detector 36 having a DC voltage amplitude that is within the operating range of the voltage controlled horizontal oscillator 44 as limited hereinbefore.

In order to prevent such erroneous lock-in of the phase detector 36 to harmonics of the sync signal $F_h/N$ and the horizontal sweep signal $F_h$, a low pass filter 58 is inserted into the feedback circuit between the output terminal 46 of the voltage controlled horizontal oscillator 44 and the input terminal 50 of the phase detector 36 that is tuned to filter out frequencies above the 15,750 Hz desired frequency, thus eliminating harmonics of any frequencies within the limited operating range of the voltage controlled horizontal oscillator 44. The resulting filtered signal is depicted as $F_h''$, and as shown it contains no ambiguous voltage peaks which may be locked in by the phase detector 36.

It is apparent that proper limitation on the operating range of the voltage controlled horizontal oscillator 44, and the addition of a low pass filter 56 is effective to regulate the frequency of the horizontal sweep signal without requiring a frequency dividing circuit. It is also apparent from the teachings of the present invention that a circuit may be designed to translate any sync signal $F_h/N$ detected from the rate of movement of the motion picture film, and having a frequency less than the desired frequency of the horizontal sweep signal $F_h$, into a frequency regulated horizontal sweep signal. Furthermore, it is apparent that the circuits disclosed may be made compatible to alternately designed phase detectors that are well known in the art.

From the description of the preferred embodiment set forth above, it is apparent that the invention can be practiced in many alternative ways. The invention may be practiced in substantially the same manner as disclosed in the preferred embodiments at the European 50 Hz television field rate frequency or any other standard field rate frequency.

Also, it is apparent that the number and spacing of the indicia on the rotating disc may be varied in accordance with the teachings of the present invention to accommodate any rate of disc rotation necessitated by different film frame rates and/or sprocket wheels rotating at different rates.

Furthermore, it is apparent that the indicia located on the tracks on the rotating disc may be opaque or transparent to light and may consist of slits in an opaque disc or light absorbing or reflecting ink on an opaque or a transparent disc, or indicia may be embossed on the tracks and electromechanically sensed. It is also apparent also that many other means of generating a sync signal $F_h/N$ from the rate of movement of the motion picture film may be contemplated.

As may be seen a novel system has been disclosed for producing a horizontal sweep signal for controlling the horizontal deflection of each line scan of a flying spot scanner employed in the transformation of images of an ordinary inexpensive motion picture film into video signals for television transmission or direct connection to the antenna terminals of a conventional television receiver. The number and spacing of the indicia that are detected to produce the sync signal with respect to the number and spacing of the indicia that are detected to produce the vertical sync signal automatically provides for 2:1 interlace of successive scanning fields of the flying spot scanner.

In summary, it will be readily apparent by virtue of the novel arrangement disclosed whereby the vertical deflection signal, the horizontal sweep signal and the raster deflection signal are all detected in synchronism from the moving motion picture film, the deflection of the scanning beam of the flying spot scanner is readily effected in exact synchronism with the film movement.

The invention has been described in detail with particular reference to the preferred embodiment thereof, but it will be understood that variations and modifications can be effected within the spirit and scope of the invention.

We claim:

1. Apparatus for scanning continuously moving information bearing media with a repetitive line scansion produced at a predetermined sweep frequency $F_h$, said apparatus comprising:
   a. means responsive to the movement of the media for generating a first signal having a frequency $F_h/N$ equal to an integral submultiple N of the predetermined sweep frequency $F_h$; and
   b. means for producing a sweep signal having the predetermined sweep frequency $F_h$ comprising:
      1. means for filtering the sweep signal to remove all harmonic frequencies of the predetermined sweep frequency $F_h$:
      2. means adapted to receive the first signal and the filtered sweep signal, said means being responsive to a predetermined relationship in the phase of the first signal and the filtered sweep signal for producing a second signal having a parameter dependent upon said relationship; and
      3. oscillator means responsive to the parameter of the second signal for generating the sweep signal and for controlling the sweep frequency $F_h$ thereof, said oscillator means being restricted in operating frequency to a range of $(N - ½)/N \times F_h$ to $(N + ½)/N \times F_h$.

2. The apparatus of claim 3 wherein said first signal generating means further comprises:

a. a disc adapted to rotate at a predetermined rate relative to the rate of movement of the information bearing media and having indicia disposed thereon in a track; and b. means located adjacent to said track for detecting the movement of the indicia and generating the first signal responsive thereto.

3. The apparatus of claim 1 wherein the second signal producing means is responsive to the phase difference between the frequencies of the first signal and the filtered sweep signal for producing a phase difference signal, and the second signal producing means further comprises means for integrating the phase difference signal to produce the second signal.

4. The apparatus of claim 3 wherein the second signal is a variable DC voltage signal and the sweep signal generating means comprises a voltage controlled oscillator that oscillates at a sweep frequency dependent upon an amplitude of the DC voltage signal.

5. Apparatus for scanning the frames of a continuously moving motion picture film in a television field pattern including a plurality of spaced horizontal line scansions produced at a predetermined horizontal sweep frequency $F_h$, said apparatus comprising:

a. a disc adapted to rotate at a predetermined rate related to the rate of movement of the motion picture film and having indicia disposed thereon in a track;

b. means located adjacent said track for detecting the movement of the indicia and generating a first signal having a frequency $F_h/N$ equal to an integral submultiple N of the predetermined horizontal sweep frequency $F_h$; and c. means for producing a horizontal sweep signal having the predetermined horizontal sweep frequency $F_h$ comprising:

1. means for filtering the horizontal sweep signal to remove all harmonic frequencies of the predetermined horizontal sweep frequency $F_h$;
2. phase detector means having a first input terminal adapted to receive the first signal and a second input terminal adapted to receive the filtered horizontal sweep signal, said phase detector means being responsive to a phase difference between the frequencies of the first signal and the filtered horizontal sweep signal for producing a phase difference signal at an output terminal thereof;
3. integrating means adapted to receive the phase difference signal from the output terminal of the phase detector means for integrating the phase difference signal to produce a second signal having a variable DC voltage amplitude; and
4. voltage controlled horizontal oscillator means having an input terminal adapted to receive the second signal, said oscillator means being responsive to the second signal for generating the horizontal sweep signal at a horizontal sweep frequency $F_h$ dependent upon the DC voltage amplitude of the second signal, said oscillator means being restricted in operating frequency to a range of $(N - ½)/N \times F_h$ to $(N + ½)/N \times F_h$.

* * * * *